US010657080B2

(12) United States Patent
Shih et al.

(10) Patent No.: US 10,657,080 B2
(45) Date of Patent: May 19, 2020

(54) METHOD AND SYSTEM FOR CHECKING ERRORS ON CABLES (71) Applicant: QUANTA COMPUTER INC., Taoyuan (TW)

(72) Inventors: Ching-Chih Shih, Taoyuan (TW); Lien-Hsun Chen, Taoyuan (TW); Chiao-Lun Tsai, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 56 days.

(21) Appl. No.: 16/041,065

(22) Filed: Jul. 20, 2018

(65) Prior Publication Data

US 2019/0303315 A1 Oct. 3, 2019

Related U.S. Application Data (60) Provisional application No. 62/649,734, filed on Mar. 29, 2018.

(51) Int. Cl.
*G06F 13/16* (2006.01)
*G06F 13/42* (2006.01)
*G06F 13/38* (2006.01)
*G06F 13/10* (2006.01)
*G06F 13/40* (2006.01)

(52) U.S. Cl.
CPC ........ *G06F 13/1678* (2013.01); *G06F 13/102* (2013.01); *G06F 13/385* (2013.01); *G06F 13/4022* (2013.01); *G06F 13/4282* (2013.01); *G06F 2213/0026* (2013.01)

(58) Field of Classification Search
CPC ............. G06F 13/4282; G06F 13/1678; G06F 13/4022; G06F 13/4027; G06F 2213/0026; G06F 13/385
See application file for complete search history.

(56) References Cited

U.S. PATENT DOCUMENTS

| 2015/0254200 | A1 | 9/2015 | McGlone et al. |
| 2015/0324268 | A1 | 11/2015 | Du |
| 2016/0147705 | A1 | 5/2016 | Arroyo et al. |
| 2017/0046075 | A1* | 2/2017 | Fuxa ................... G06F 13/4027 |

OTHER PUBLICATIONS

Extended European Search Report for EP Application No. 18207259. 5, dated May 23, 2019.
TW Office Action for Application No. 107138098, dated Dec. 9, 2019, w/ First Office Action Summary.
TW Search Report for Application No. 107138098, dated Dec. 9, 2019, w/ First Office Action.

* cited by examiner

*Primary Examiner* — Ernest Unelus
(74) *Attorney, Agent, or Firm* — Nixon Peabody LLP; Zhou Lu (57) ABSTRACT A system and method for insuring efficiency of a serial link between a host server and a switch is disclosed. A fabric switch has upstream ports associated with a serial link. A fabric controller is coupled to the switch. A host server includes a BIOS and a management controller. The host server has ports coupled to the serial link ports via cables to form lanes of the serial link. A memory is accessible by the controller and the management controller. The management controller reads an expected speed and width of the serial link from the memory. The BIOS determines an actual speed and width of the serial link. The management controller sends an error message if the actual speed and width do not match the expected speed and width.

19 Claims, 8 Drawing Sheets

METHOD AND SYSTEM FOR CHECKING ERRORS ON CABLES

CROSS-REFERENCE TO RELATED APPLICATIONS

This application claims priority to and the benefit of U.S. Provisional Patent Application No. 62/649,734, filed Mar. 29, 2018 and entitled "PCIe CABLE ERROR CHECKING ALGORITHM," the contents of which are herein incorporated by reference in their entirety as if fully set forth herein.

TECHNICAL FIELD

The present disclosure relates generally to checking for errors on connections to devices on a fabric card. More particularly, aspects of this disclosure relate to using a common memory for comparison of expected and actual link data to identify erroneous cable connections between ports of a switch and ports of a host.

BACKGROUND

The emergence of the cloud for computing applications has increased the demand for off-site installations, known as data centers, that store data and run applications accessed by remotely connected computer device users. Such data centers typically have massive numbers of servers, switches, and storage devices to store and manage data. A typical data center has physical rack structures with attendant power and communication connections. The racks are arranged in rows throughout the room, or rooms, of the data center. Each rack includes a frame that has slots or chassis between two side walls. The slots may hold multiple network devices such as servers, switches, and storage devices. There are many such network devices stacked in such rack structures found in a modern data center. For example, some data centers have tens of thousands of servers, attendant storage devices, and network switches. Thus, a typical data center may include tens of thousands, or even hundreds of thousands, of devices in hundreds or thousands of individual racks.

In order to efficiently allocate resources, data centers include many different types of devices in a pooled arrangement. Such pooled devices may be assigned to different host servers as the need for resources arises. Such devices may be connected via Peripheral Component Interconnect Express (PCIe) protocol links between the device and the host server that may be activated by a PCIe type switch.

Figure 1A:
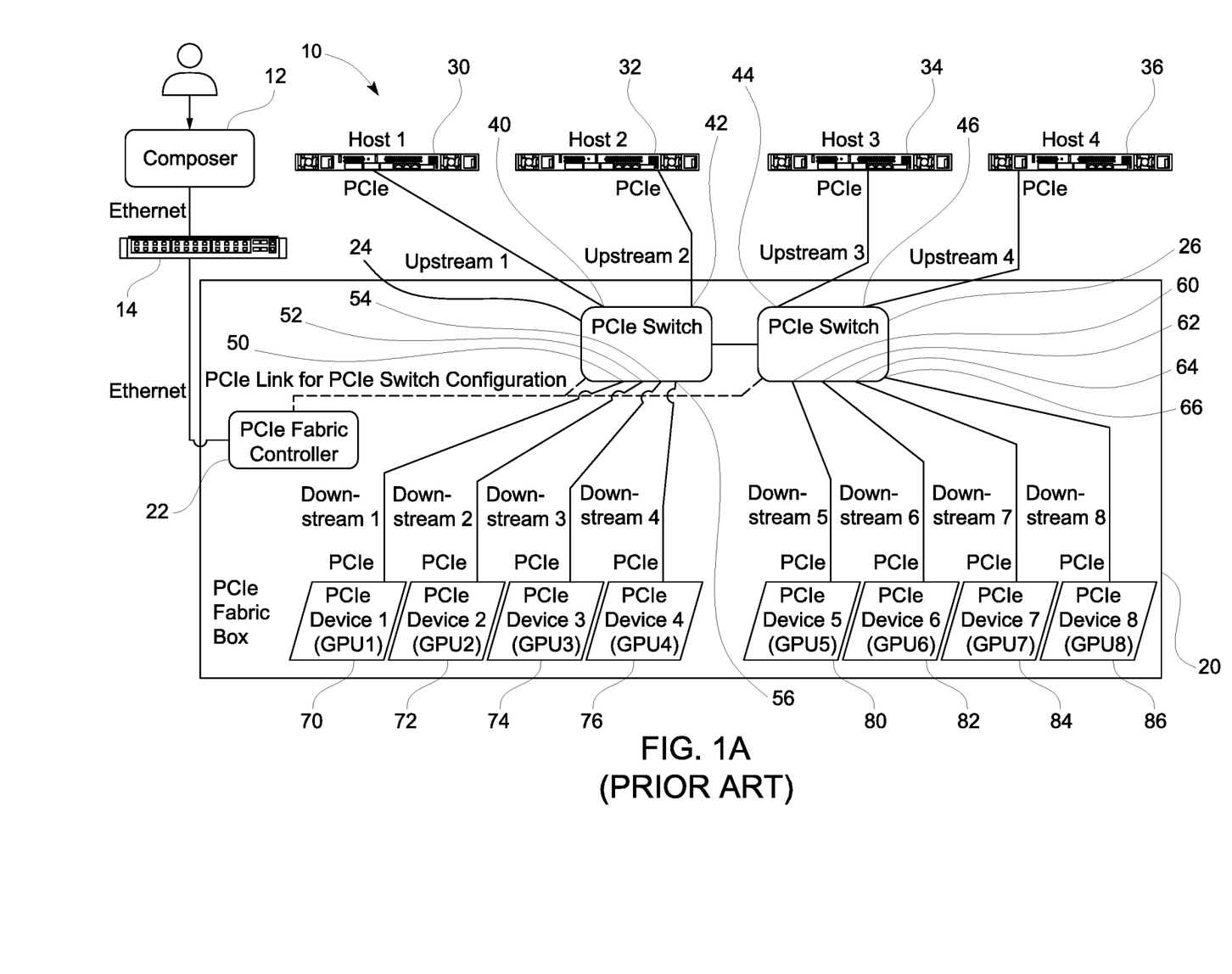
FIG. 1A-1D are block diagrams of an example of prior art fabric boxes and different PCIe link and lane configurations.

Thus, many modern data centers now support disaggregate architectures with numerous pooled devices. An example of such a data center 10 is shown in FIG. 1A. A system administrator may access a composer application 12 that allows configuration data to be sent via a router 14 to a PCIe fabric box 20. The PCIe fabric box 20 includes numerous serial expansion bus devices, such as PCIe compatible devices that may be accessed by other devices in the data center. In this example, the PCIe fabric box 20 includes a fabric controller 22 that may receive configuration data through a network from the router 14. The fabric box 20 includes PCIe switches, such as the PCIe switches 24 and 26, that allow host devices such as host servers 30, 32, 34, and 36 to be connected to different PCIe devices in the fabric box 20. The PCIe switch 24 includes upstream ports 40 and 42, and the PCIe switch 26 includes upstream ports 44 and 46. The upstream ports 40, 42, 44, and 46 are connected via a cable to the host servers 30, 32, 34, and 36. The PCIe switch 24 also includes downstream ports 50, 52, 54, and 56. The PCIe switch 26 includes downstream ports 60, 62, 64, and 66. In this example, there are multiple devices in the fabric box 20 coupled to the respective downstream ports of the switches 24 and 26. These devices may be accessed by any of the host servers 30, 32, 34, and 36.

As shown in FIG. 1A, two host servers 30 and 32 are directly coupled to the upstream ports 40 and 42 of the switch 24, while two host servers 34 and 36 are directly coupled to the upstream ports 44 and 46 of the switch 26. In this example, devices 70, 72, 74, and 76 are directly coupled to the downstream ports 50, 52, 54, and 56 of the PCIe switch 24. Devices 80, 82, 84, and 86 are directly coupled to the downstream ports 60, 62, 64, and 66 of the PCIe switch 26. Additional devices and host servers may be supported by adding additional PCIe switches. The example system 10 allows certain system resources to be removed from host servers and provided by the outside pooled device box 20 instead. Thus, different types of system resources may be allocated to the needs of different servers as they arise. For example, the devices 70, 72, 74, 76, 80, 82, 84, and 86 may each be a resource such as a non-volatile memory (NVMe), a graphic processing unit (GPU), a field programmable gate array (FPGA), a network interface card (NIC), or other kinds of PCIe compatible devices. Each such device may be dynamically assigned to hosts, such as the host servers 30, 32, 34, and 36.

The major interface between the host servers and the fabric box is typically a Peripheral Component Interconnect Express (PCIe) standard. In FIG. 1A, four PCIe links from the two PCIe switches 24 and 26 may each support one of four PCIe lanes. Each of the PCIe lanes is thus assigned to one of the host servers 30, 32, 34, and 36. However, different implementations may be used to increase performance by increasing the maximum data exchanged between the host servers and the fabric box. For example, one link may support four PCIe lanes; two links may support eight PCIe lanes; or four links may support eight PCIe lanes. The number of lanes supported by the links depends on the performance requirement of the fabric box being used. In general, the greater number of lanes (the greater the link width) and thus greater transmission speed may be achieved.

Figure 1B:
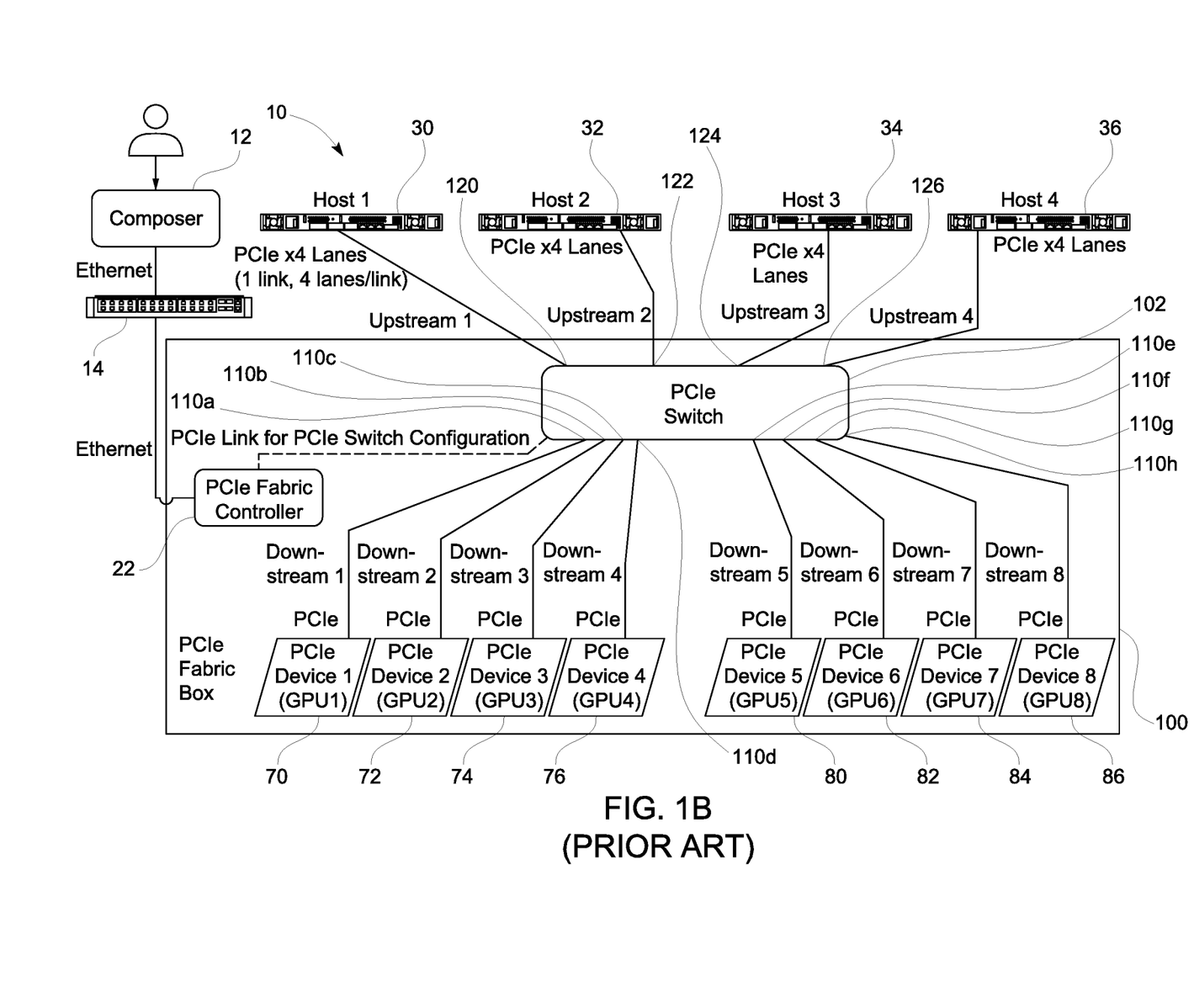

FIG. 1B shows a fabric box 100 having a host interface of one link supporting 4 PCIe lanes. Like fabric box, device and host server elements are labeled with identical element numbers in FIG. 1B as in FIG. 1A. The fabric box 100 has a single PCIe switch 102 with four lanes that are connected to the four host servers 30, 32, 34, and 36. The single PCIe switch 102 has downstream ports 110a-110h that are connected to devices 70, 72, 74, 76, 80, 82, 84, and 86. The single PCIe switch 102 has upstream ports 120, 122, 124, and 126 that are connected to respective host servers 30, 32, 34, and 36. Cabling for the fabric box 100 is relatively straight forward as there is only one cable required for connecting each of the four host servers 30, 32, 34, and 36 to the PCIe switch 102.

Figure 1C:
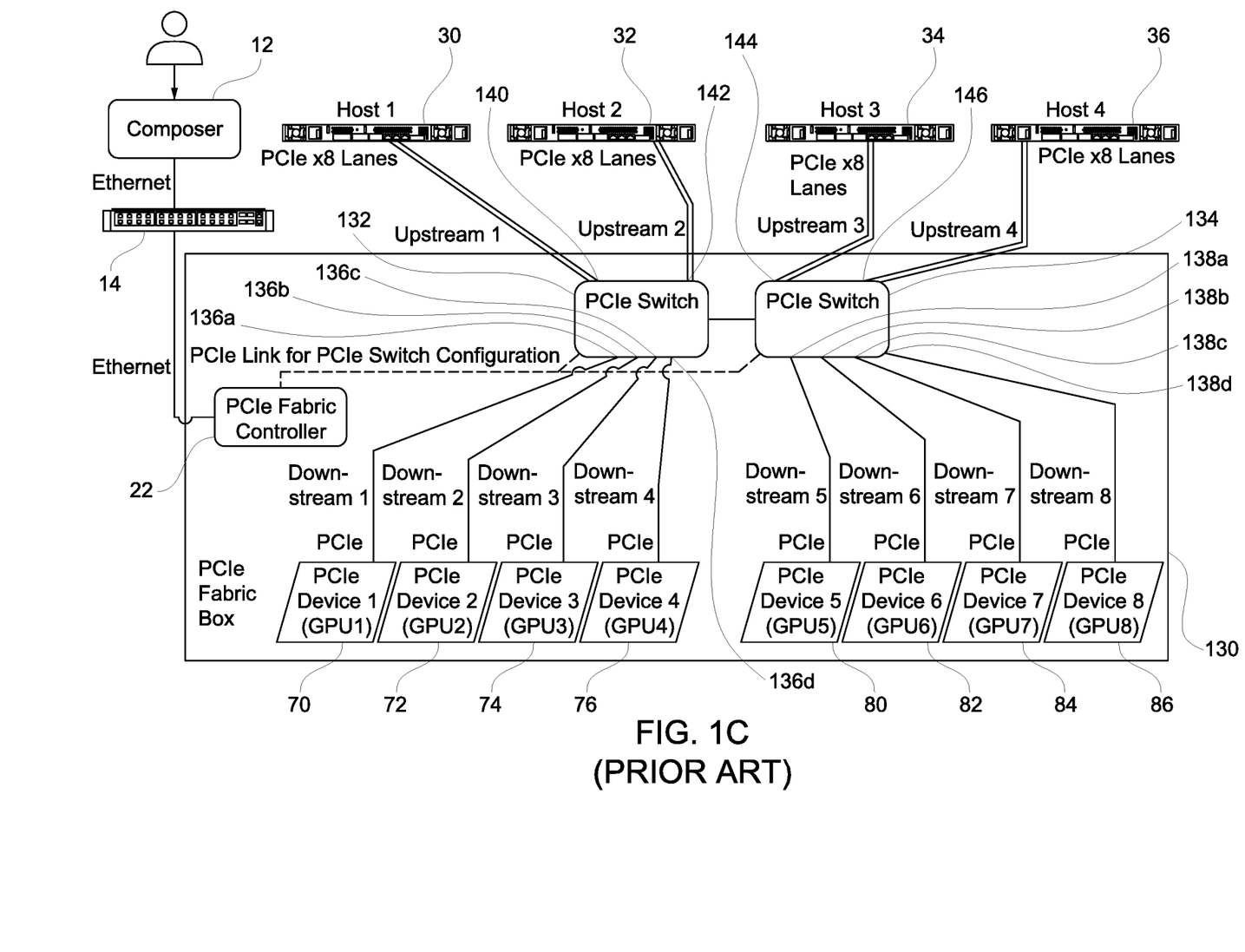

FIG. 1C shows a fabric box 130 having a host interface of two PCIe links supporting 8 PCIe lanes. Like the fabric box, device and host server elements are labeled with identical element numbers in FIG. 1C as in FIG. 1A. The fabric box 130 includes two PCIe switches 132 and 134. The PCIe switch 132 includes downstream ports 136a-136d that are connected to devices 70, 72, 74, and 76, respectively. The PCIe switch 134 includes downstream ports 138a-138d that are connected to devices 80, 82, 84, and 86, respectively. In this example, the switch 132 includes two upstream links 140 and 142 that are coupled to the host servers 30 and 32, respectively. The switch 134 includes two upstream links 144 and 146 that are coupled to the host servers 34 and 36, respectively. Each of the upstream links 140, 142, 144, and 146 includes two lanes, each through one cable. Therefore, there is one cable for each lane that connect respective upstream ports to ports on the host server.

Figure 1D:
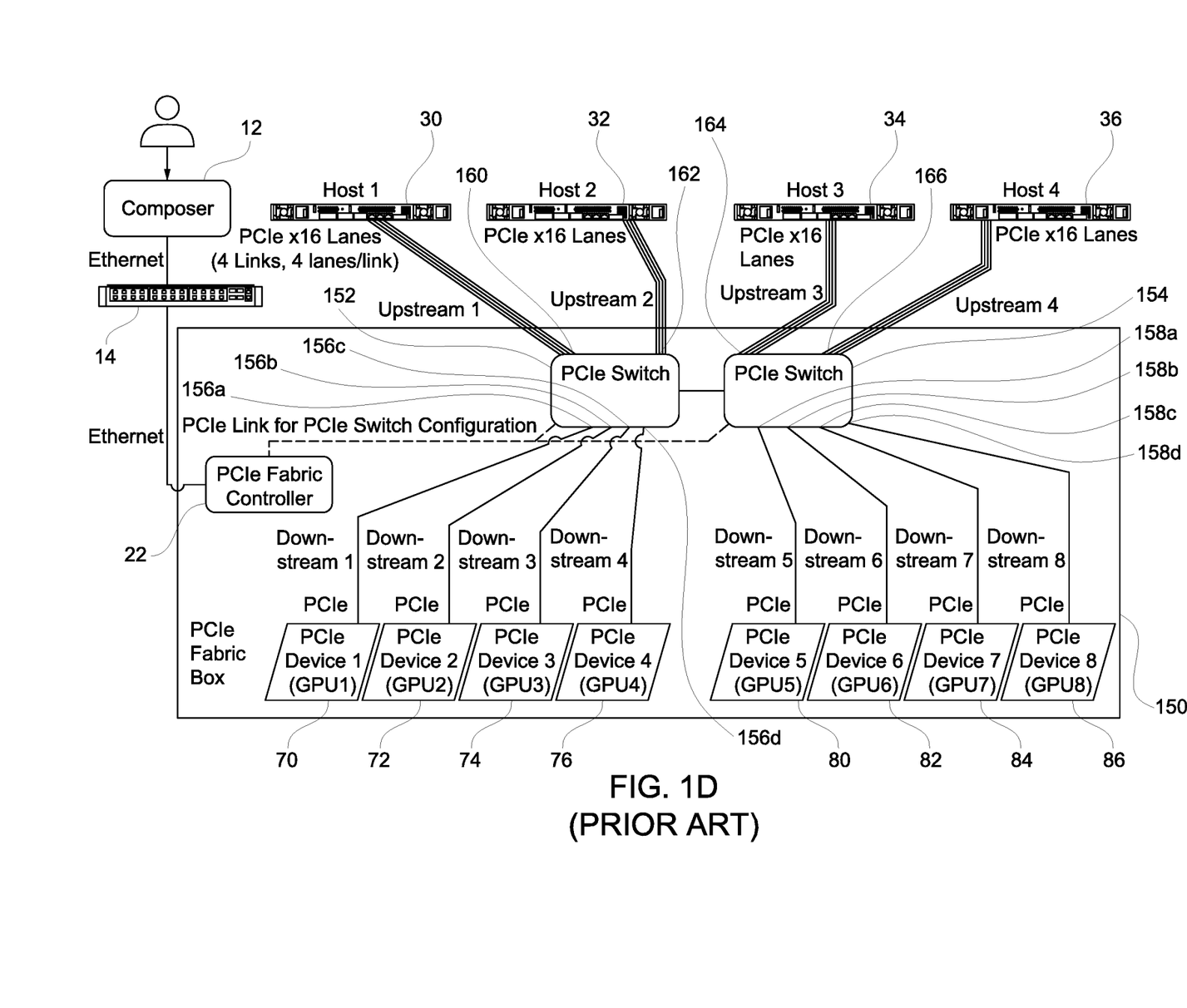

FIG. 1D shows a fabric box 150 having a host interface of four PCIe links supporting 16 PCIe lanes. Like the fabric box, device and host server elements are labeled with identical element numbers in FIG. 1D as in FIG. 1A. The fabric box 150 includes two PCIe switches 152 and 154. The PCIe switch 152 includes downstream ports 156a-156d that are connected to devices 70, 72, 74, and 76, respectively. The PCIe switch 154 includes downstream ports 158a-158d that are connected to devices 80, 82, 84 and 86, respectively. In this example, the switch 152 includes two upstream links 160 and 162 that are coupled to the host servers 30 and 32, respectively. The switch 154 includes two upstream links 164 and 166 that are coupled to the host servers 34 and 36, respectively. Each of the upstream links 160, 162, 164, and 166 include four lanes. Therefore, there are four cables for each link that connect respective upstream ports to ports on the host server.

Figure 2A:
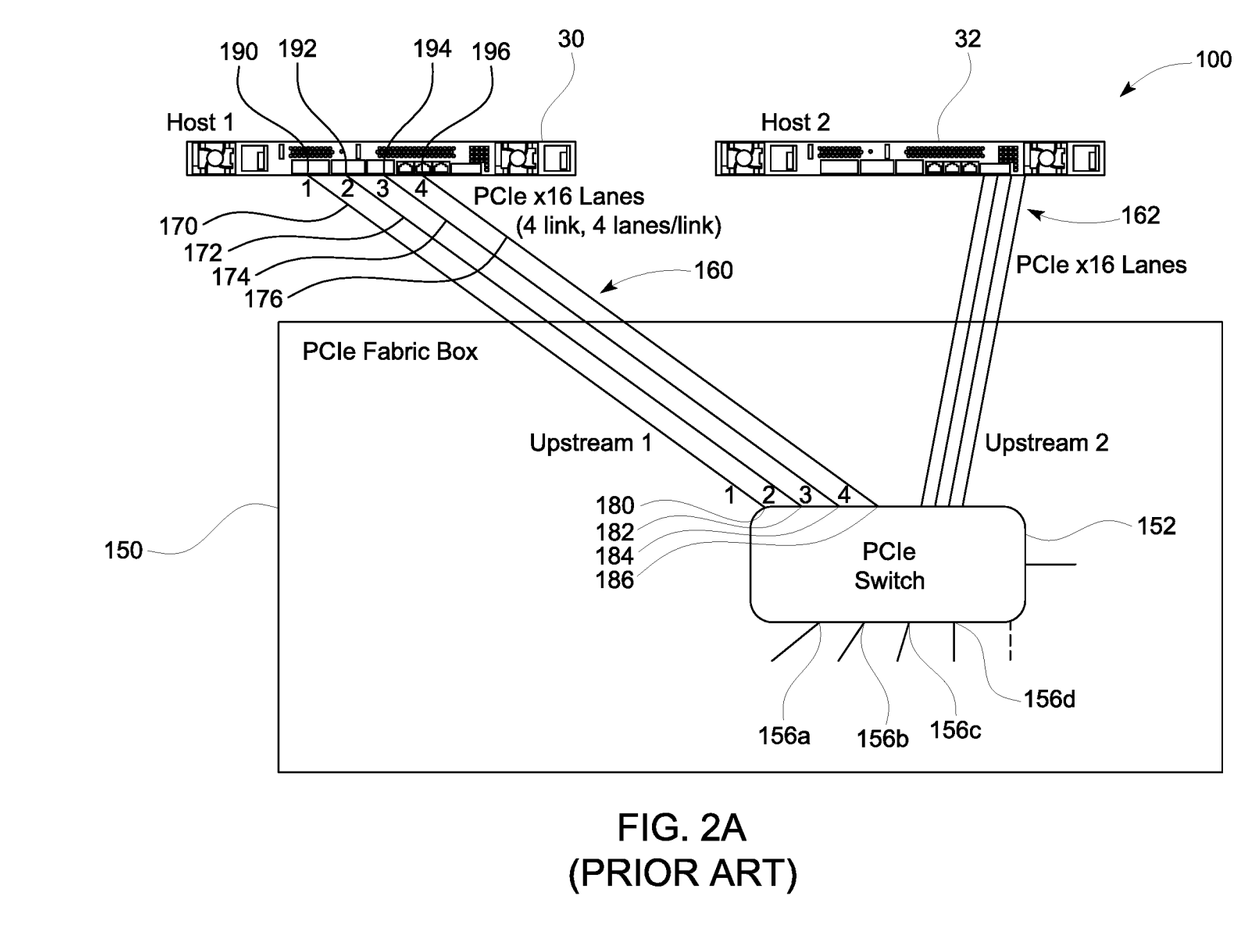
FIG. 2A is a diagram of one of the PCIe lanes in one of the servers connected to a switch of the fabric box in FIG. 1D with a correct cable configuration.

For larger configurations, such as those with multiple links resulting in 8 lanes or 16 lanes, multiple cables are required for each link. The cable order is very important in order for the PCIe physical link between the switch and the host server to be successfully configured to maximize link speed. For example, in the case of a host server having four ports that each are a PCIe lane, the cables should be ordered to be connected to the corresponding upstream ports on the PCIe switch in the same order. FIG. 2A is a close up diagram of the correct cable connection between the switch 152 and the host server 30 in FIG. 1D.

As may be seen in FIG. 2A, the PCIe link 160 has four lanes that include a series of four cables 170, 172, 174, and 176 that connect four respective upstream ports 180, 182, 184, and 186 of the switch 152. The other ends of cables 170, 172, 174, and 176 are connected to ports 190, 192, 194, and 196 of the host server 30. Thus, the group of ports on both the switch 152 and the host server 30 are connected in the same order. This configuration allows maximum speed for the PCIe link 160 as all four lanes may be used.

Figure 2B:
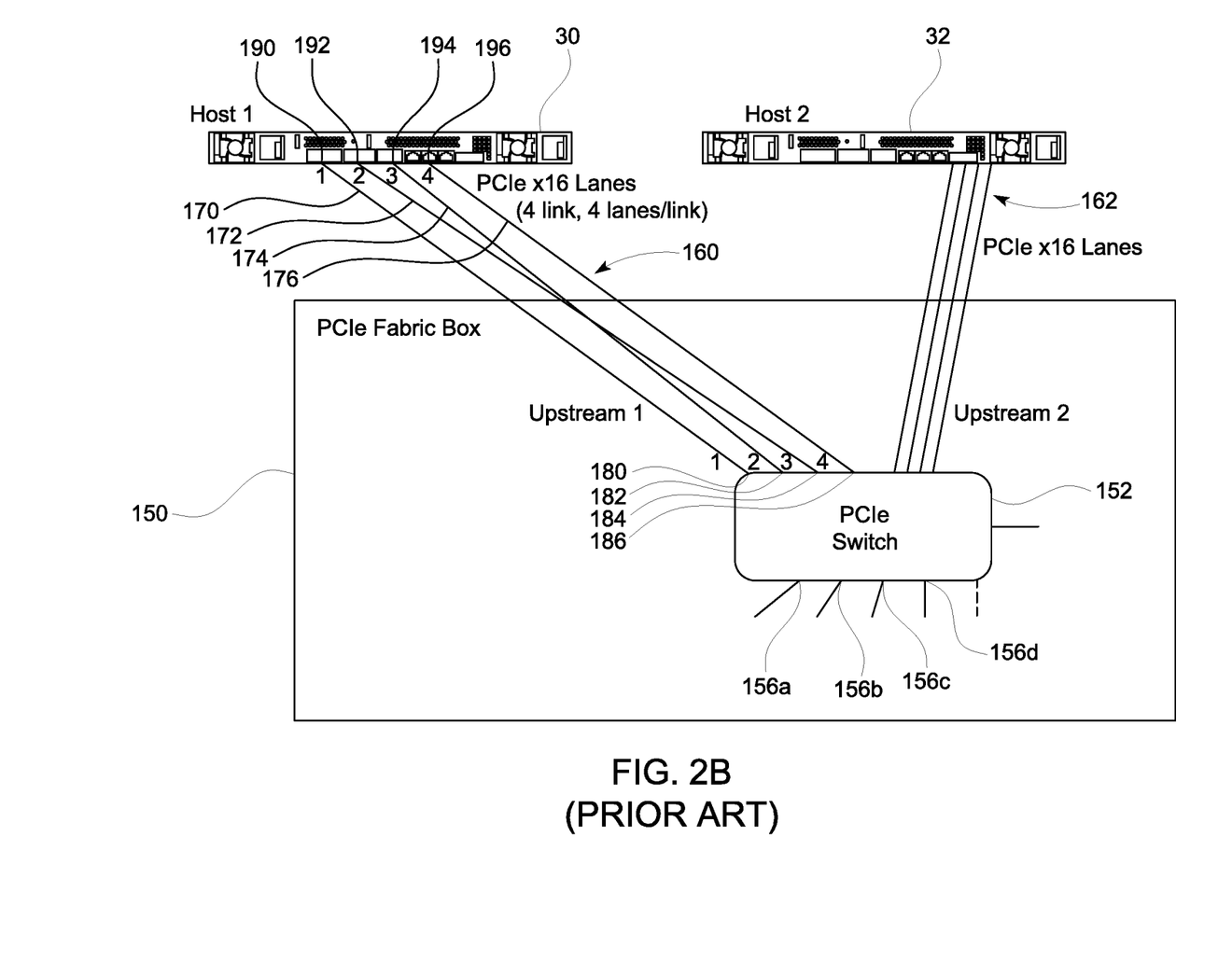
FIG. 2B is a diagram of one if the PCIe lanes in one of the servers connected to a switch of the fabric box in FIG. 1D with an incorrect cable configuration resulting in a decrease in lane speed.

However, when one of the cables 170, 172, 174, and 176 is misconnected, all of the connections of the link are affected. FIG. 2B is a close up view of the system in FIG. 1D, where the cable 172 from the port 192 has been misconnected to the upstream port 184 of the PCIe switch 152. The cable 174 from the port 194 has also been misconnected to the upstream port 182 of the PCIe switch 152. This misconnection that changes the order of the ports is a misconfiguration case that will cause the PCIe speed of the link to be downgraded from 4 lanes to 1 lane.

With the larger number of cables for certain PCIe link configurations with multiple lanes, such misconnections are increasingly possible. FIG. 2B therefore illustrates a relatively common occurrence where a user connects cables in the wrong order, resulting in a PCIe speed downgrade when the design uses multiple cables for a PCIe link group. Currently, there is no ready method to inform a data center operator that a misconfiguration of cables has occurred, and therefore miscommunication between an allocated device and a host server suffers.

Thus, there is a need for the identification of a misconnection of cables in a multi-lane configuration of PCIe links. There is a further need for automatic detection of the misconnection of cables between a shared resource box and a host server. There is a further need for training a host server device to detect an unexpected reduction in link speed to indicate a cable misconnection.

SUMMARY

One disclosed example is a system for insuring efficiency of a serial link between a host server and a fabric switch. The fabric switch has upstream ports associated with a serial link. The host server includes a BIOS and a management controller. The host server has ports coupled to the serial link ports via cables to form lanes of the serial link. A memory is accessible by the management controller. The management controller reads an expected speed and width of the serial link from the memory. The BIOS determines an actual speed and width of the serial link. The management controller sends an error message if the actual speed and width do not match the expected speed and width.

Another disclosed example is a method to determine proper connections for a serial link between a host server and a fabric switch. The serial link has a plurality of lanes between ports of the host server and upstream ports of the fabric switch. The ports of the host server are connected with the upstream ports of the fabric switch via cables. An expected speed and width of the serial link is stored in a memory accessible by the host server. The expected speed and width of the serial link is read via the host server. An actual speed and width of the serial link is determined via the host server. The expected speed and width is compared with the actual speed and width. An error message is generated via the host server if the actual speed and width differ from the expected speed and width.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which.

The present disclosure is susceptible to various modifications and alternative forms. Some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The present inventions can be embodied in many different forms. Representative embodiments are shown in the drawings, and will herein be described in detail. The present disclosure is an example or illustration of the principles of the present disclosure, and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at," "near," or "nearly at," or "within 3-5% of," or "within acceptable manufacturing tolerances," or any logical combination thereof, for example.

Figure 3:
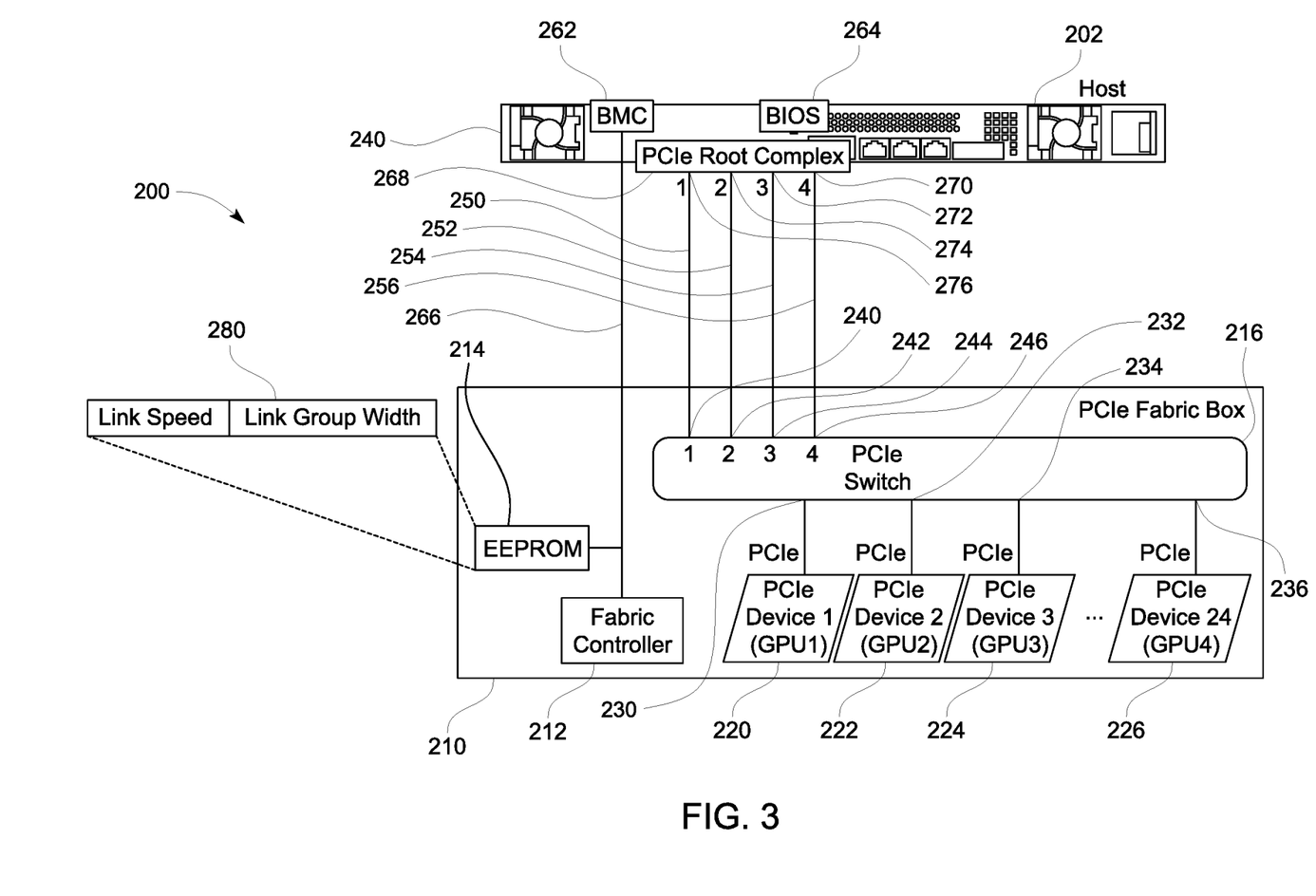
FIG. 3 is a block diagram of a fabric box and host server system that detects speed deficiencies indicating misconnected cables.

FIG. 3 shows a block diagram of a system 200 for allocating device resources to different hosts. The system 200 includes a host server 202 that is coupled to a PCIe fabric box 210. The PCIe fabric box 210 includes numerous serial expansion bus devices such as Peripheral Component Interconnect Express (PCIe) compatible devices that may be accessed by the host server 202, or other devices in the data center. In this example, each host server such as the host server 202, has a PCIe link with multiple lanes connecting it to the PCIe fabric box 210. The multiple lanes are created by connected cables between ports of the host server 202 and the PCIe fabric box 210. As the number of links increases, the number of lanes increases, and the possibility of misconnection of cables between the ports also increases. Such misconnections will decrease the operation of the link or links between host servers and the PCIe fabric box 210. The system 200 allows detection of such misconnections. The system 200 will alert a system administrator and thus the misconnection may be corrected.

In this example, the PCIe fabric box 210 includes a fabric controller 212 that may supervise the connection of device resources in the fabric box 210 to host servers such as the host server 202. Although only one host server 202 is shown, there may be multiple host servers connected to the PCIe fabric box 210 that may access the PCIe compatible devices.

The fabric box 210 includes a memory device such as an EEPROM 214. Alternatively, the internal memory in the fabric controller 212 may also be used. In this example, the fabric controller 212 executes a control application to allocate devices to linked host servers, such as the host server 202, using a PCIe switch 216. The fabric box 210 may read data in the EEPROM 214 and may write data to the EEPROM 214. In this example, PCIe compatible devices 220, 222, 224, and 226 are coupled to respective downstream ports 230, 232, 234, and 236 of the PCIe switch 216. The PCIe compatible devices 220, 222, 224, and 226 may include a non-volatile memory (NVMe), a graphic processing unit (GPU), a field programmable gate array (FPGA), a network interface card (NIC), a redundant array of independent disks (RAID) interface card, an I-IBA card or other kinds of PCIe compatible devices.

Since the PCIe switch 216 is a PCIe device, different upstream ports 240, 242, 244, and 246 may each form a single PCIe link with four lanes. One end of a series of four cables 250, 252, 254, and 256 are connected to the upstream ports 240, 242, 244, and 246. As will be explained below, the four cables 250, 252, 254, and 256 provide four lanes of a PCIe link between the fabric box 210 and the host server 202. Each lane may have more than one cable to increase the bandwidth of the lane. Higher capacity cable may allow one cable to be allocated for more than one lane. The PCIe switch 216 may have additional ports that may be organized into additional PCIe links. There may be additional PCIe switches similar to the PCIe switch 216, that allow additional links of variable width lanes in the fabric box 210.

The host server 202 includes a baseboard management controller (BMC) 262 and a BIOS 264. The BMC 262 is coupled via an inter-integrated circuit (I2C) bus 266 to the EEPROM 214 and the fabric controller 212 of the fabric box 210. The I2C bus 266 may be a separate cable connecting the fabric box 210 to the host sever 202 or it may be an unused line on one of the cables 250, 252, 254, and 256. Thus, the BMC 262 may read data stored in the EEPROM 214. If the internal memory of the fabric controller 212 is used instead of the EEPROM 214, the BMC 262 may read data stored in the internal memory for the same purposes explained below. The host server 202 includes a PCIe root complex interface 268. The PCIe root interface 268 includes ports 270, 272, 274, and 276 that connect the other ends of the cables 250, 252, 254, and 256. In this example, the host server 202 and the switch 216 may have multiple other ports for additional lanes of other links to each other or other devices. The PCIe link formed by the cables 250, 252, 254, and 256 allow the host server 202 to access the devices 220, 222, 224, and 226 of the fabric box 210. For example, if the host server 202 requires additional graphic processing, one of the devices 220, 222, 224, and 226 may be a graphic processing unit that may be accessed by the host server through the PCIe switch 216 and some or all of the cables 250, 252, 254, and 256. The cables 250, 252, 254, and 256 must be connected in the correct order of the ports to insure maximum efficiency of the PCIe link connection by being able to use all the corresponding lanes.

The inter-integrated circuit (I2C) bus 266 between the BMC 262 of the host server 202 and the fabric controller 212 allows both the BMC 262 and the controller 212 to share the EEPROM 214. Thus, data on the EEPROM 214 on PCIe fabric box 210 may be accessed by both the BMC 262 of the host server 202, and the fabric controller 212 of the PCIe fabric box 210. The fabric controller 212 programs hardware dependent, pre-defined information 280 to the EEPROM 214. In this example, the pre-defined information 280 includes the expected link speed of the connection between the host server 202 and the fabric box 210 and the link group width. The expected link speed in this example may be from a protocol standard such as PCIe Gen1, Gen 2, Gen 3, or Gen 4, or new version speeds of the PCIe standards. Alternatively, other protocols may be used. The link group width in this example is the number of lanes for the links, which may be 4, or 8, or 16 lanes, or more. The link width is determined by the initial configuration of the hardware in the system. In this example, each lane is formed by connecting a cable between ports of the host server 202 and the fabric box 210.

On connection of the I2C bus 266, the BMC 262 detects the EEPROM 214 and determines there is a PCIe fabric box connection to the host server 202. The BMC 262 reads the link speed and link group width from the EEPROM 214 and stores this information. The stored information in the BMC 262 is available to the BIOS 264. When the host server 202 powers on, the BIOS 264 gets the link speed and link group width from the BMC 262. The BIOS 264 performs PCIe bus training based on the link speed and link group width. Once the bus training is completed, the BIOS 264 obtains the current PCIe link speed and link width from the root complex interface 268.

The training link speed and link group width result obtained by the BIOS 264 is compared with the link speed and link group width provided by the BMC 262. If the values do not match, the BIOS 264 will re-train several times to obtain the current link speed and link group width. The number of times, the BIOS 264 will perform retraining is predetermined by the system configuration. After the last retraining, the BIOS 264 will obtain a final PCIe current "Link Speed" and "Link Width" settings result. If the resulting current speed and width does not match to the expected speed and width values provided by the BMC 262, the BIOS 264 will generate an error log as the mismatch indicates that cables have been incorrectly connected to the ports. The BIOS 264 will update the final PCIe "Link Speed" and "Link Width" training result to the BMC 262. The BMC 262 will report the expected value by reading the stored data from the EEPROM 214 and the current training result of the BIOS 264 by an application programming interface (API). The host server 202 may generate an alert to an operator indicating a cable misconnection. The operator may obtain information about the decrease in link speed and therefore reconnect misconnected cables in the correct order.

Below is a code segment that shows the normal case result from the API. The below code segment is normal because the current speed and width match the expected speed and width, thus indicating that the cables forming the lanes of the link are properly connected to the respective ports of the host server 202 and the switch 216 of the fabric box 210. In this example, the link between the host server 202 and the fabric box 210 is at expected speed of 3 and an expected width of 16.

Normal Case Example API:

```
"PCIeConnectionInfo": [
    {
        "CurrentSpeed": "3",
        "CurrentWidth": "16",
        "ExpectedSpeed": "3",
        "ExpectedWidth": "16",
        "PCIeConnectionId": "D8C4971B8F030134",
        "SlotNum": "0x01",
        "Status": {
            "Health": "OK",
            "State": "Enabled"
        }
    },
]
```

An example of a code segment that shows an error case result from the API is shown below. In this example, the current width is 8, but the expected width is 16, thereby indicating a cable misconnection. This error case may be caused by a cable in FIG. 3 being disconnected or misconnected. For example, the cable 252 in FIG. 3 may be connecting the port 272 to the port 234; and the cable 254 connecting the port 274 to the port 232.

Error Case 1: Width Mismatch

```
"PCIeConnectionInfo": [
    {
        "CurrentSpeed": "3",
        "CurrentWidth": "8",
        "ExpectedSpeed": "3",
        "ExpectedWidth": "16",
        "PCIeConnectionId": "D8C4971B8F030134",
        "SlotNum": "0x01",
        "Status": {
            "Health": "Critical",
            "State": "Enabled"
        }
    },
]
```

Another example of a code segment that shows an error case resulting from the API is shown below. In this example, the current speed is 2, the current width is 8, but the expected speed is 3 and the expected width is 16, thereby indicating a defective cable.

Error Case 2: Speed Mismatch

```
"PCIeConnectionInfo": [
    {
        "CurrentSpeed": "2",
        "CurrentWidth": "8",
        "ExpectedSpeed": "3",
        "ExpectedWidth": "16",
        "PCIeConnectionId": "D8C4971B8F030134",
        "SlotNum": "0x01",
        "Status": {
            "Health": "Critical",
            "State": "Enabled"
        }
    },
]
```

The above code segments are examples of the output of one example API. However, the information in the code segments may be provided by other kinds of protocols or formats. If the expected values and current settings values do not match, the BMC 262 can report an error, and generate an entry in an event log. In this example, the operator may check the error by an API executed by the BMC 262. The API may provide data such as the expected speed and width of the link, and the current speed and width of the link, to assist an operator in diagnosis of the error.

Figure 4:
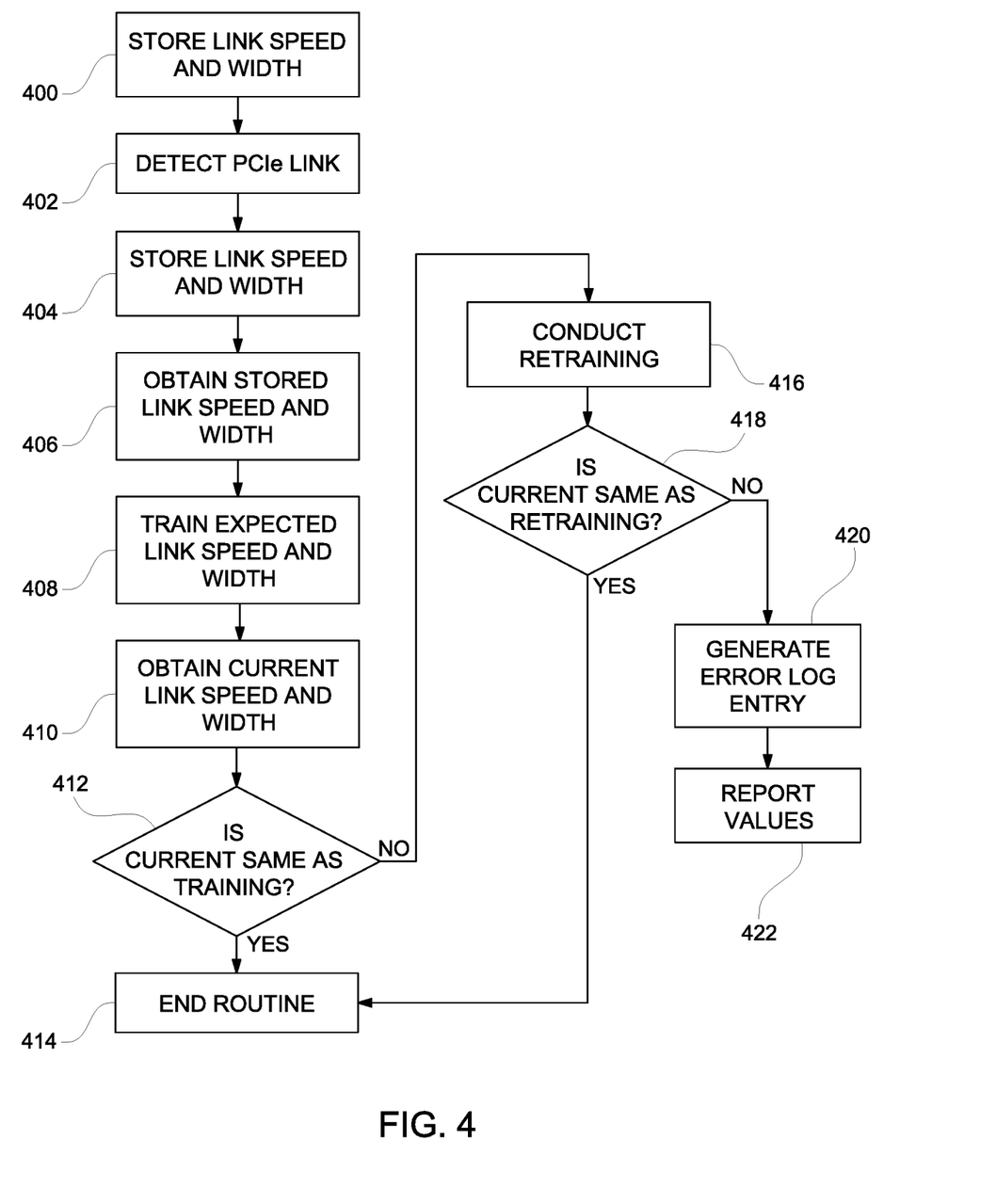
FIG. 4 is a flow diagram for the process of determining link speed for the purpose of determining whether cables are misconnected.

A flow diagram in FIG. 4 is representative of example machine readable instructions for checking proper cable connection by the fabric controller 212, BMC 262, and BIOS 264 in FIG. 3. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware.

Also, some or all of the machine readable instructions represented by the flowcharts may be implemented manually. Further, although the example algorithm is described with reference to the flowchart illustrated in FIG. 4, persons of ordinary skill in the art will readily appreciate that many other methods of implementing the example machine readable instructions may alternatively be used. For example, the order of execution of the blocks may be changed, and/or some of the blocks described may be changed, eliminated, or combined.

The link speed and link group width for the links from the PCIe switch 216 is stored in the EEPROM 214 by the fabric controller 212 (400). Through the I2C bus 266, the BMC 262 detects the stored link speed and link group width information and determines that there is a PCIe link between the host server 202 and the PCIe switch 216 (402). The BMC 262 reads the stored link speed and link group width information and stores the information (404). On power-up of the server 202, the BIOS 264 obtains the link speed and link group width information from the BMC 262 (406). The BIOS 264 then begins a training routine for the PCIe bus to obtain the current link speed and link group width from the PCIe root complex 268 (408). Once training is complete, the BIOS 264 obtains the current link speed and link group width (410).

The training result is compared with the current link speed and link group width (412). If the training result matches the current link speed and link group width, the BIOS 264 will end the check routine (414). If the training result does not match, the BIOS 264 will retrain to obtain the current link speed and link group width from the PCIe root complex 268 (416). After retraining, the BIOS 264 will determine whether the retraining result matches the current link speed and link group width (418). If the retraining result matches the current link speed and link group width, the BIOS 264 will end the check routine (414). If the retraining result does not match, the BIOS 264 will generate an error log entry (420). The BMC 262 will report the expected value from the EEPROM 214 and the current value from the BIOS 264 (422).

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A system for insuring efficiency of a serial link, the system comprising:
   a fabric switch having a plurality of upstream ports associated with the serial link to a host server;
   the host server including a BIOS and a baseboard management controller, the host server having a plurality of ports directly connected to the upstream ports associated with the serial link via cables, each cable directly connecting one of the plurality of ports with one of the upstream ports to form lanes of the serial link;
   a memory accessible to the baseboard management controller; and
   wherein the baseboard management controller reads an expected speed and width of the serial link from the memory, the BIOS determines an actual speed and width of the serial link, and the baseboard management controller sends an error message when either the actual speed or actual width differ from the expected speed or expected width to indicate one of the cables is improperly connecting one of the plurality of ports with one of the plurality of upstream ports.

2. The system of claim 1, wherein the memory is an EEPROM.

3. The system of claim 1, further comprising a fabric controller coupled to the switch, wherein the fabric controller is operable to access the memory.

4. The system of claim 3, wherein the memory is on board the fabric controller.

5. The system of claim 3, wherein the fabric controller is operative to store the expected speed and width of the serial link in the memory.

6. The system of claim 1, further comprising a plurality of devices, and wherein the fabric switch has downstream ports coupled to the plurality of devices.

7. The system of claim 6, wherein the memory and plurality of devices are in a fabric box.

8. The system of claim 6, wherein the fabric switch connects the host server with one of the plurality of devices via the lanes of the serial link.

9. The system of claim 1, wherein the serial link is a peripheral component interface express protocol.

10. The system of claim 1, further comprising a bus coupling the memory and the baseboard management controller.

11. A method of determining proper connections for a serial link between a host server and a fabric switch, the serial link having a plurality of lanes between ports of the host server and upstream ports of the fabric switch, the method comprising:

directly connecting the ports of the host server with the upstream ports of the fabric switch via cables, each cable directly connecting one of the plurality of ports with one of the upstream ports to form lanes of the serial link;

storing an expected speed and width of the serial link in a memory accessible by a baseboard management controller of the host server;

reading the expected speed and width of the serial link via the baseboard management controller of the host server;

determining an actual speed and width of the serial link via a BIOS of the host server;

comparing the expected speed and width with the actual speed and width; and generating an error message via the baseboard management controller of the host server when either the actual speed or actual width differ from the expected speed or the expected width to indicate one of the cables is improperly connecting one of the plurality of ports with one of the plurality of upstream ports.

12. The method of claim 11, wherein the memory is an EEPROM.

13. The method of claim 11, wherein the memory is on board a fabric controller.

14. The method of claim 11, wherein the fabric switch includes downstream ports coupled to a plurality of devices.

15. The method of claim 14, wherein the memory, and plurality of devices are in a fabric box.

16. The method of claim 15, further comprising activating a fabric switch to connect the host server with one of the plurality of devices via the lanes of the serial link.

17. The method of claim 11, wherein the serial link is a peripheral component interface express protocol.

18. The method of claim 11, wherein a bus couples the memory and the host server.

19. The method of claim 11, wherein a fabric controller stores the expected speed and width of the serial link in the memory.

* * * * *